(12) United States Patent
Lam

(10) Patent No.: US 7,617,797 B2
(45) Date of Patent: Nov. 17, 2009

(54) PET UTILITY DEVICE

(76) Inventor: Pui Yue Lam, No. 48 Kennedy Rd. 2 Floor Block E Monticello, Wan Chai, Hong Kong (CN)

( * ) Notice: Subject to any disclaimer, the term of this patent is extended or adjusted under 35 U.S.C. 154(b) by 186 days.

(21) Appl. No.: 11/968,172

(22) Filed: Jan. 1, 2008

(65) Prior Publication Data

US 2008/0156275 A1 Jul. 3, 2008

Related U.S. Application Data

(60) Provisional application No. 60/883,214, filed on Jan. 3, 2007.

(51) Int. Cl.
*A01K 1/02* (2006.01)
(52) U.S. Cl. .................... 119/497; 119/28.5
(58) Field of Classification Search .......... 119/496, 119/497, 482, 28.5, 498; 224/153, 155, 156, 224/578–580; 190/1, 2, 8; *A01K 1/00, 1/02, A01K 1/03, 1/035*
See application file for complete search history.

(56) References Cited

U.S. PATENT DOCUMENTS

| | | | | |
|---|---|---|---|---|
| 5,937,720 A | * | 8/1999 | Itzov | 83/397 |
| 5,941,195 A | * | 8/1999 | Martz | 119/497 |
| 6,021,740 A | * | 2/2000 | Martz | 119/497 |
| 6,076,485 A | * | 6/2000 | Peeples et al. | 119/497 |
| 7,458,451 B2 | * | 12/2008 | Godshaw et al. | 190/18 A |
| 2003/0127060 A1 | * | 7/2003 | Yeung | 119/497 |

FOREIGN PATENT DOCUMENTS

JP 2002281854 A * 10/2002

* cited by examiner

*Primary Examiner*—Son T Nguyen
*Assistant Examiner*—Shadi Baniani
(74) *Attorney, Agent, or Firm*—James A. Italia; Italia IP

(57) ABSTRACT

A pet utility device for reversibly converting from a pet bed to a pet carrier or pet seat, the device comprising a shell portion, wherein the shell portion includes lateral portions, a rear portion, a bottom portion, shell gusset portions, and sealable flap portion; a pad portion, for detachable attachment to a portion of the shell portion wherein the pad portion includes pad gusset portions; sealing device located on the periphery of the lateral portions, the sealable flap portion, and the bottom portion of the shell portion; wherein when the sealing device is utilized during the reversible conversion from a pet bed to a pet carrier or pet seat, the bottom portion engages the lateral portions such that the shell gusset portions and pad gusset portions retract and fold-up upon themselves thereby sealing the bottom portion of the lateral portions and the sealable flap portion to the lateral portions.

10 Claims, 2 Drawing Sheets

PET UTILITY DEVICE

CROSS-REFERENCE TO RELATED APPLICATION

This application claims the benefit of the filing date under 35 USC 119(e) of the filing date of U.S. Provisional Application Ser. No. 60/883,214, filed Jan. 3, 2007, the contents of which are hereby incorporated by reference.

BACKGROUND

This application relates generally to a pet utility device. More specifically, this application relates to a pet utility device that provides the user a device that couples various useful forms suitable for pet transportation and comfort into one convenient form.

SUMMARY

Pet carriers, pet beds, and pet transport devices such as pet car seats or "pet seats" are well known in the art. This application relates to a pet utility device that can convert to those various forms such that the need for multiple devices is eliminated. The various forms included in the pet utility device disclosed herein include, generally, a pet bed, a pet carrier, and a pet seat. As used herein, the "pet carrier" form includes various embodiments such as a tote, backpack, wheeled carrier with retractable handle, and simply carrying the carrier by a provided handle. As used herein, the "pet seat" form includes means such that the device can be secured to any seat that utilizes a seat belt or any other retaining means.

More specifically, the application discloses a pet utility device for reversibly converting from a pet bed to a pet carrier or pet seat, said device comprising: a shell portion, wherein said shell portion includes two lateral portions, a rear portion, a bottom portion, shell gusset portions, and a sealable flap portion; a pad portion, for detachable attachment to a portion of said shell portion wherein said pad portion includes pad gusset portions; sealing means located on the periphery of said lateral portions, said sealable flap portion, and said bottom portion of said shell portion; and, wherein when said sealing means is utilized during the reversible conversion from a pet bed to a pet carrier or pet seat, the bottom portion engages the lateral portions such that the shell gusset portions and pad gusset portions retract and fold-up upon themselves thereby sealing the bottom portion to the lateral portions and the sealable flap portion to the lateral portions.

The application also discloses a pet utility device for reversibly converting from a pet seat or pet carrier to a pet bed, said device comprising: a shell portion, wherein said shell portion includes two lateral portions, a rear portion, a bottom portion, and a sealable flap portion; a pad portion for detachable attachment to a portion of said shell portion; and, sealing means located on the periphery of said lateral portions, a portion of said sealable flap portion, and a portion of said bottom portion of said shell portion for reversibly converting said device from a pet seat or pet carrier to a pet bed.

The application further discloses a pet utility device for reversibly converting from a pet bed to a pet carrier or pet seat, said device comprising: a shell portion, wherein said shell portion includes two lateral portions, a rear portion, a bottom portion, shell gusset portions, and a sealable flap portion; a pad portion, for detachable attachment to a portion of said shell portion wherein said pad portion includes pad gusset portions; a pair of straps attached to said rear portion for utilizing said device in a backpack configuration wherein said straps can be reversed in their orientation such that said device can be utilized in a tote configuration; a loop portion attached to said rear portion for securing said device to a retaining means; a leash portion attached to said shell portion on one end and a clasp on the other for securing said leash to a collar; a zipper located on the periphery of said lateral portions, said sealable flap portion, and said bottom portion of said shell portion and wherein said zipper is engaged by a pair of sliders wherein each zipper is attached to a handle; and, wherein when said handle is utilized to engage the zipper during the reversible conversion from a pet bed to a pet carrier or pet seat, the bottom portion engages the lateral portions such that the shell gusset portions and pad gusset portions retract and fold-up upon themselves thereby sealing the bottom portion to the lateral portions and the sealable flap portion to the lateral portions.

BRIEF DESCRIPTION OF THE DRAWINGS

The drawings, when considered in connection with the following description, are presented for the purpose of facilitating an understanding of the subject matter sought to be protected.

FIG. 1A is a front perspective view of the pet bed form of the pet utility device;

FIG. 1B is a front perspective view of the pet utility device during a stage of the conversion from a pet bed to a pet carrier or pet seat;

FIG. 1C is a rear perspective view of the pet utility device shown in FIG. 1B;

FIG. 1D is a rear perspective view of the pet utility device during a stage of the conversion from a pet bed to a pet carrier or pet seat;

FIG. 1E is a side perspective view of the pet utility device during a stage of the conversion from a pet bed to a pet carrier or pet seat, or as a partially open form of a pet carrier or pet seat;

FIG. 1F is a side perspective view of the pet carrier or pet seat form of the pet utility device;

DETAILED DESCRIPTION

Figure 1:
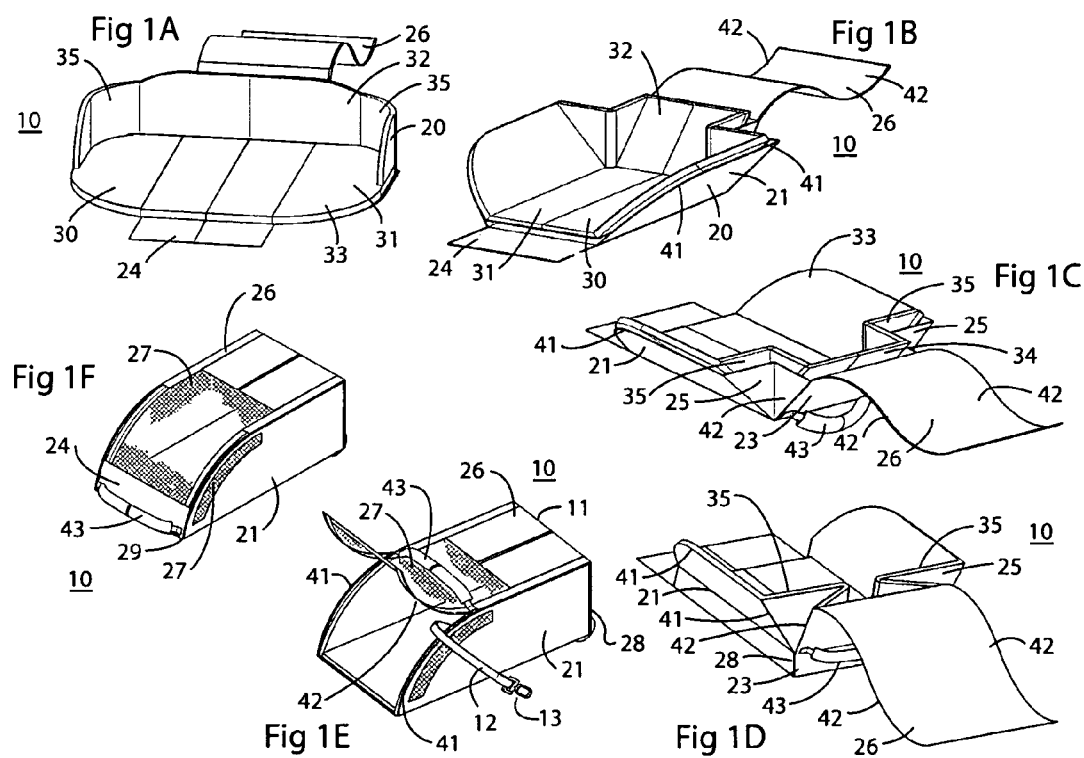
FIG. 1, which includes subparts A-F, is a multi-figure progression showing the reversible conversion of the device from a pet bed to a pet carrier or pet seat.

Referring to FIG. 1, shown therein and generally designated by the reference character 10 is a first embodiment of the pet utility device constructed in accordance with the following description. The device 10 includes a shell portion 20, a pad portion 30, sealing means 40, and carrying or transportation means 50.

As may be seen more clearly in FIG. 1, and in particular FIG. 1A, the device 10 is shown in the pet bed form which includes a shell portion 20 that is shaped to receive the pad portion 30. See also FIG. 1B for a better representation of the two layers. The shell portion includes two lateral portions 21, a rear portion 22, a bottom portion 23, a foldable flap portion 24, two shell gusset portions 25, and a sealable flap portion 26. The sealable flap portion 26 and lateral portions 21 includes mesh portions 27 which allow air to enter the device 10 when sealed. See FIGS. 1E and 1F. The shell portion 20 can be made of any durable flexible material such as rubberized cloth, canvas or any other similar material.

The pad portion 30 includes a first portion 31 and second portion 32, wherein each first and second portion includes a top surface 33 and a bottom surface 34. The pad portions 30 are generally made of a soft stain resistant material that is common in the art with respect to pet beds. The pad portions may be filled with foam to add greater comfort, which can be removed if the pad portion is to be washed. The second pad portion 32 also includes pad gusset portions 35. The pad gusset portions 35 generally do not include foam so as to allow for the folding of the gussets 35 during conversion of the device 10 from one form to another. The function and operation of the shell gussets 25 and pad gussets 35 are described more fully below. The pad portions 30 and shell portion 20 include means for detachably securing them to on another. Such means are common in the art and include, but are not limited to, Velcro, snaps, hooks, buttons and any other means that would allow the pad portions 30 to be detached from the shell portion 20 for cleaning or for any other purpose.

The sealing means 40 includes first zipper portions 41 located on the periphery of the lateral shell portions 21 and second zipper portions 42 located on the periphery of both the sealable flap portion 26 and the bottom portion 23. See FIG. 1C. The two zipper portions 41 and 42 are sealed using a handle 43 which is coupled to a pair of sliders (not shown). Other sealing means 40 such as hooks, buttons, snaps and any other means that allows two ends to be joined together are contemplated as part of the present invention.

During the reversible conversion of the device 10 from a pet bed (FIG. 1A) to a pet carrier (FIG. 1F) or pet seat (FIG. 1F) the handle 43 is pulled upward which causes the sliders to engage the first and second zipper portions 41 and 42 located on the periphery of lateral portions 21 and the bottom portion 23 respectively. See FIG. 1C. As the handle continues up the periphery of the bottom portion 23 and lateral portions 21 (FIG. 1D), the shell gusset portions 25 and pad gusset portions 35 retract and fold-up upon themselves thereby creating a sealed edge 28 on each side of the device 10. The handle then continues, as shown in FIG. 1E, up the periphery of the sealable flap portion 26 and lateral portions 21 further engaging the first and second zipper portions 41 and 42 respectively until the handle 43 reaches the top 29 of the sealable flap portion 26 and lateral portions 21 thereby sealing the sides of the device and converting the pet bed to a pet carrier or pet seat (FIG. 1F). The foldable flap portion 24 can then be tucked under the handle 43 as shown in FIG. 1F further sealing the top 29 of the sealable flap portion 26.

Alternatively, as shown in FIG. 1E, the user can leave the handle at a position midway up 11 the lateral portions 21 to provide an open front so that the pet is easily accessible in either the pet carrier or pet seat form. As further shown in FIG. 1E, the device 10 may also include a leash 12 that includes means of securing it to the shell portion 20 at one end and a clasp 13 for securing to a pet collar at the other end. The leash 12 is particularly helpful when the user elects to transport its pet in this open front form at the midway position 11 as it helps to prevent the pet from jumping out of the pet carrier or pet seat.

It should be appreciated that the conversion of the pet carrier or pet seat forms to the pet bed form is accomplished by simply reversing the description presented above. Briefly, the handle 43 is pulled down thereby disengaging first zipping portion 41 of the lateral portions 21 from the second zipping portions 42 of the sealable flap portion 26 and then bottom portion 23 which causes that the shell gussets 25 and the pad gussets to expand from their folded state and the pet bed form is obtained.

Figure 2:
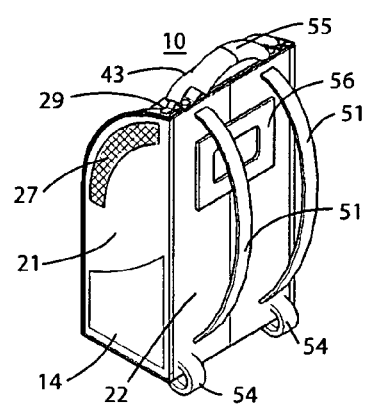
FIG. 2 is a perspective view of the pet utility device showing the pet carrier form of FIG. 1F wherein the form is a backpack.
Figure 3:
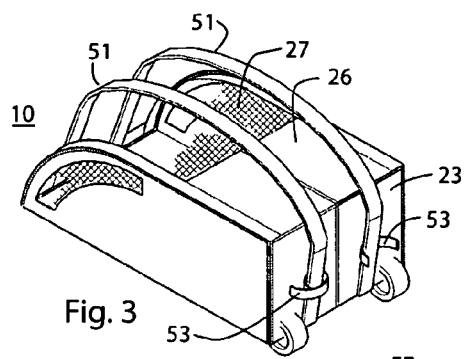
FIG. 3 is a perspective view of the pet utility device showing the pet carrier form of FIG. 1F wherein the form is a tote.

Referring now to FIGS. 2-5, various carrying or transportation means 50 are shown incorporated on the pet utility device 10. As previously described, the handle 43 can be used to carry the device 10 when it is at the top position 29. Further, as shown in FIG. 2, straps 51 can be attached to the rear portion 22 as is common in the art so that the device 10 can be carried as a backpack in the pet carrier form. In FIG. 3, the straps 51 in FIG. 2 are reversed from the rear portion 22, although still connected to the rear portion 22, so that they are now located above the bottom portion 23 and sealable flap portion 26. In this position the device 10 can be carried as a tote in the pet carrier form. Clasps 53 are located and secured onto the bottom portion 23 of the device 10 and are used to retain the straps 51 in the proper position when using the pet carrier in the tote configuration. The clasps 53 secure the straps 51 in the proper position by closing around a portion of the straps using various means including but not limited to Velcro, snaps, buttons, snaps, etc. To better show how the clasps work, one of the clasps 53 is shown open and the other is shown closed around the strap 51. See FIG. 3.

Figure 4:
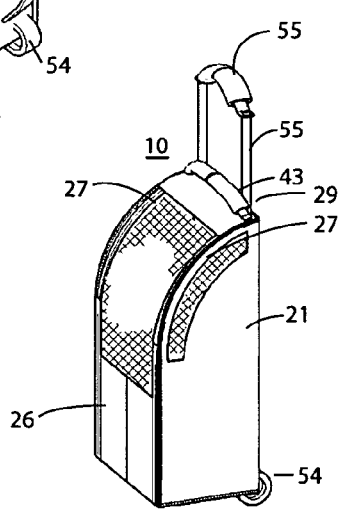
FIG. 4 is a perspective view of the pet utility device showing the pet carrier form of FIG. 1F wherein the form includes wheels and a retractable handle.

Referring now to FIG. 4, the pet utility device 10 is shown in the pet carrier form wherein the form includes wheels 54 and a retractable handle 55. In FIG. 4 the retractable handle is shown extended and in FIG. 2 the retractable is shown retracted in the device 10. FIG. 2 also shows that lateral portions 21 of the shell can include storage means such as pockets 14.

Figure 5:
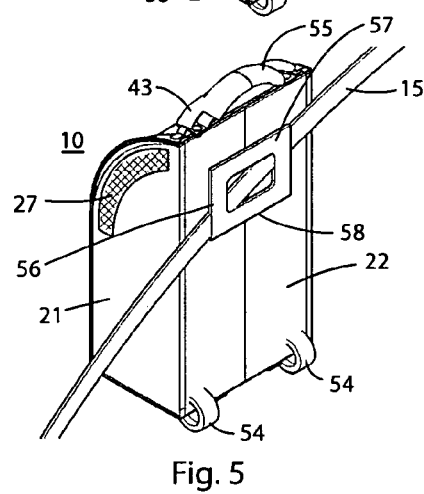
FIG. 5 is a perspective view of the pet utility device showing the pet seat form of FIG. 1F attached to a representative retaining means.

Finally, referring to FIG. 5, the pet utility device 10 is shown in the pet seat form wherein a loop 56 is secured to the rear portion 22 of the device at its upper 57 and lower portions 58. The loop 56 is used to secure the pet seat to a retaining means such as a seatbelt when a user needs to transport their pet in a car, train, airplane, boat or whenever they want the pet seat to be easily securable by a retaining means. An example of how a seat belt 15 engages the device 10 via the loop 56 is shown in FIG. 5. As shown, the belt 15 is able to pass through the space created beneath the loop 56 and above the rear portion 22. In FIG. 5 the straps 51 are removed so that the details of the pet seat function can be more clearly seen. See FIG. 2 for an example of the device 10 shown with the straps 51 and loop 56.

While the present disclosure has been described in connection with what is considered the most practical and preferred embodiment, it is understood that this disclosure is not limited to the disclosed embodiments, but is intended to cover various arrangements included within the spirit and scope of the broadest interpretation so as to encompass all such modifications and equivalent arrangements.

What is claimed is:

1. A pet utility device for reversibly converting from a pet bed to a pet carrier or pet seat, said device comprising:
  a shell portion, wherein said shell portion includes two lateral portions, a rear portion, a bottom portion, shell gusset portions, and a sealable flap portion;
  a pad portion, for detachable attachment to a portion of said shell portion wherein said pad portion includes pad gusset portions;
  a pair of straps attached to said rear portion for utilizing said device in a backpack configuration;

a loop portion attached to said rear portion for securing said device to a retaining means;

a leash portion attached to said shell portion on one end and a clasp on the other for securing said leash to a collar;

a sealing means located on the periphery of said lateral portions, said sealable flap portion, and said bottom portion of said shell portion and wherein said sealing means is engaged by a pair of sliders wherein each sealing means is attached to a handle; and, wherein when said handle is utilized to engage the sealing means during the reversible conversion from a pet bed to a pet carrier or pet seat, the bottom portion engages the lateral portions such that the shell gusset portions and pad gusset portions retract and fold-up upon themselves thereby sealing the bottom portion to the lateral portions and the sealable flap portion to the lateral portions.

2. The device of claim 1 wherein said sealing means is a zipper which includes a pair of sliders.

3. The device of claim 2 further comprising a handle attached between said sliders such that said handle is utilized to engage the sealing bags during the reversible conversion from a pet bed to a pet carrier or pet seat.

4. The device of claim 3 further comprising a mesh portion on said sealable flap portion.

5. The device of claim 3 further comprising a mesh portion on at least one of rear portion for utilizing said device in a backpack configuration.

6. The device of claim 1 wherein said straps can be reversed in their orientation such that said device can be utilized in a tote configuration.

7. The device of claim 6 further comprising a pair of closable clasps attached to said bottom portion for securing said straps in the tote configuration.

8. The device of claim 1 further comprising a pair of wheels and a retractable handle.

9. The device of claim 1 further comprising a foldable flap portion for further sealing the top of said sealing flap portion of said device.

10. The device of claim 1 wherein said lateral portions further comprise further comprise storage means.

* * * * *